(12) United States Patent
Maloney et al.

(10) Patent No.: US 10,590,559 B2
(45) Date of Patent: Mar. 17, 2020

(54) ANODIZING AND PRE-ANODIZING PROCESSES BASED ON INCOMING LASER TEXTURED PART

(71) Applicant: Apple Inc., Cupertino, CA (US)

(72) Inventors: Max A. Maloney, San Francisco, CA (US); Michael S. Nashner, San Jose, CA (US); Sean R. Novak, San Jose, CA (US)

(73) Assignee: APPLE INC., Cupertino, CA (US)

( * ) Notice: Subject to any disclaimer, the term of this patent is extended or adjusted under 35 U.S.C. 154(b) by 41 days.

(21) Appl. No.: 14/835,541

(22) Filed: Aug. 25, 2015

(65) Prior Publication Data

US 2016/0265117 A1    Sep. 15, 2016

Related U.S. Application Data

(60) Provisional application No. 62/133,240, filed on Mar. 13, 2015.

(51) Int. Cl.
| | |
|---|---|
| *B44C 1/22* | (2006.01) |
| *C25D 11/26* | (2006.01) |
| *C25D 11/16* | (2006.01) |
| *C25F 3/20* | (2006.01) |
| *B23K 26/354* | (2014.01) |
| *B23K 26/352* | (2014.01) |
| *C25D 11/04* | (2006.01) |
| *C25D 11/18* | (2006.01) |
| *B23K 103/10* | (2006.01) |

(52) U.S. Cl.
CPC ............ *C25D 11/16* (2013.01); *B23K 26/354* (2015.10); *B23K 26/355* (2018.08); *B23K 26/3576* (2018.08); *B44C 1/228* (2013.01); *C25F 3/20* (2013.01); *B23K 2103/10* (2018.08); *C25D 11/04* (2013.01); *C25D 11/18* (2013.01)

(58) Field of Classification Search
CPC .. B44C 1/005; B44C 1/22; B32B 3/26; B32B 3/263; B32B 3/30; Y10T 428/24355; Y10T 428/24364; Y10T 428/24479; Y10T 428/24521; Y10T 428/24537; Y10T 428/24545; Y10T 428/2457; Y10T 428/24587; Y10T 428/24612; Y10T 428/2462; Y10T 428/24942; Y10T 428/2495
USPC ....... 428/141, 142, 144, 148, 156, 161, 163, 428/164, 167, 169, 172, 173, 212, 213
See application file for complete search history.

(56) References Cited

U.S. PATENT DOCUMENTS 5,164,324 A    11/1992   Russell et al.
5,817,243 A    10/1998   Shaffer
(Continued)

*Primary Examiner* — Megha M Gaitonde
(74) *Attorney, Agent, or Firm* — Dorsey & Whitney LLP

(57) ABSTRACT

Substrates having laser textured surfaces and methods for forming the same are described. The methods involve using a laser to form three-dimensional features on a surface of the substrate. The laser three-dimensional features can be designed to interact with incident light to create unique visual effects. In some embodiments, the substrate is further treated with a pre-anodizing process and an anodizing process to form a protective metal oxide coating. In some cases, the type of pre-anodizing and anodizing process are chosen based on the geometry of the three-dimensional features and to enhance the visual effects.

19 Claims, 18 Drawing Sheets

(56) References Cited

U.S. PATENT DOCUMENTS

| | | | |
|---|---|---|---|
| 6,172,810 B1 * | 1/2001 | Fleming | G02B 5/124 |
| | | | 359/529 |
| 6,613,161 B2 | 9/2003 | Zheng et al. | |
| 8,451,873 B2 | 5/2013 | Zhang | |
| 8,846,551 B2 | 9/2014 | Gupta et al. | |
| 2004/0000540 A1 | 1/2004 | Soboyejo et al. | |
| 2005/0211680 A1 | 9/2005 | Li et al. | |
| 2010/0112298 A1 * | 5/2010 | Dai et al. | |
| 2011/0056836 A1 * | 3/2011 | Tatebe | C25D 11/16 |
| | | | 205/50 |
| 2012/0251779 A1 * | 10/2012 | Liu | C23C 14/0015 |
| | | | 428/156 |
| 2012/0267989 A1 | 10/2012 | Guan et al. | |
| 2013/0209735 A1 | 8/2013 | Kim et al. | |
| 2014/0193607 A1 | 7/2014 | Browning et al. | |
| 2014/0363608 A1 | 12/2014 | Russell-Clarke et al. | |

* cited by examiner

ANODIZING AND PRE-ANODIZING PROCESSES BASED ON INCOMING LASER TEXTURED PART

CROSS-REFERENCE TO RELATED APPLICATIONS

The present application claims the benefit of U.S. Provisional Application No. 62/133,240, entitled "ANODIZING AND PRE-ANODIZING PROCESSES BASED ON INCOMING LASER TEXTURED PART" filed Mar. 13, 2015, the content of which is incorporated herein by reference in its entirety for all purposes.

FIELD

This disclosure relates to systems and methods for forming aesthetic designs on substrate surfaces. In particular, laser texturing, pre-anodizing and anodizing processes are described.

BACKGROUND

Abrasive blasting operations are often used to create a roughened appearance and texture on surfaces of parts. Abrasive blasting involves forcibly propelling abrasive material against a part until its surface attains a desired texture. The abrasive material, often referred to as blasting media, is typically made of mineral particles, such as silica, alumina or zirconia particles. When the particles strike the surface of the part, the particles leave multiple craters on the surface and a final rugged landscape on the part.

Despite the usefulness of blasting for creating textured surfaces, blasting techniques have limitations. For example, controlling the type of texture can only be done in a global sense. In particular, the size of the particles of the blasting media dictates the size of the craters and the force at which the blasting media is propelled against the surface dictates the depth at which the craters are indented within the part. Thus, controlling media particle size and media pressure can be used to determine a final textured surface design. However, the size and depth of each crater cannot be individually controlled. In addition, blasting adds internal stress to the part since blasting involves impinging particles at high energy against the part. If the part is thin, the stresses imparted from the blasting process can deform the part. This is because blasting can impart a compressive stress to the surface of the material by the same mechanism as shot peening.

SUMMARY

This paper describes various embodiments that relate to laser textured surfaces and methods for forming and treating the same, including anodizing and anodizing pre-treatments. The methods can be used to form decorative surfaces on consumer products, such as electronic devices and accessories.

According to one embodiment, a method of forming on a surface, a metal oxide layer having a textured appearance is described. The method involves forming a texture on the surface using a laser beam. The texture includes three-dimensional features. The method also includes modifying an appearance of the texture by increasing or decreasing a light reflectivity of the three-dimensional features. The method further includes forming the metal oxide layer on the textured surface. A thickness and a transparency of the metal oxide layer is chosen based on geometries of the texture.

According to another embodiment, a method of forming a decorative design on a surface of a substrate is described. The method includes forming a design on the surface using a laser beam directed at the surface. The design includes light reflective facets. The method also involves increasing light reflective properties of the facets. The method further includes converting a portion of the substrate to a metal oxide layer. The metal oxide layer is sufficiently transparent such that at least some light incident an exterior surface of the metal oxide layer shines through the metal oxide layer and reflects off the light reflective facets.

According to a further embodiment, a part having a textured surface is described. The textured surface includes multiple three-dimensional features arranged on the surface as a design. The textured surface also includes a metal oxide layer positioned over the design. The metal oxide layer is substantially transparent to visible light and having an external surface. The multiple three-dimensional features are shaped and sized and spaced a predetermined distance apart from one another to alter the way light incident the external surface is reflected off the multiple three-dimensional features.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments.

Described herein are methods relate to creating a predetermined pattern, design or visual effect on a surface of a substrate. The methods involve forming three-dimensional features on the surface of the substrate using a laser texturing process. In some embodiments, the substrate is further treated with a pre-anodizing process and an anodizing process to form a protective metal oxide coating on the substrate. In some cases, the type of pre-anodizing and/or anodizing process is chosen based on the surface geometry of the laser textured surface.

The laser texturing processes described herein can be used in place of or in addition to traditional blasting process. Laser texturing techniques provide fine control with regard to the size and shape of the features formed on the substrate, providing a distinct advantage over texturing a surface using only a blasting process. In addition, laser texturing can reduce the amount of compressive stress experienced by the part compared to a blasting process. In some embodiments, the laser formed features are specifically designed to interact with incoming light to produce a unique and aesthetically pleasing appearance. For example, the features can design with geometries that increase reflectance of light or cause light interference effects. Likewise, a pre-anodizing and/or anodizing process can be tailored to enhance these light interactions or create different light interactions on the part.

Methods described herein are well suited for providing aesthetically appealing patterns and designs on surfaces of consumer products. For example, the methods described herein can be used to form aesthetically appealing housing or enclosures for portable electronic devices, desktop computers, mobile electronic devices and electronic device accessories, such as those manufactured by Apple Inc., based in Cupertino, Calif.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
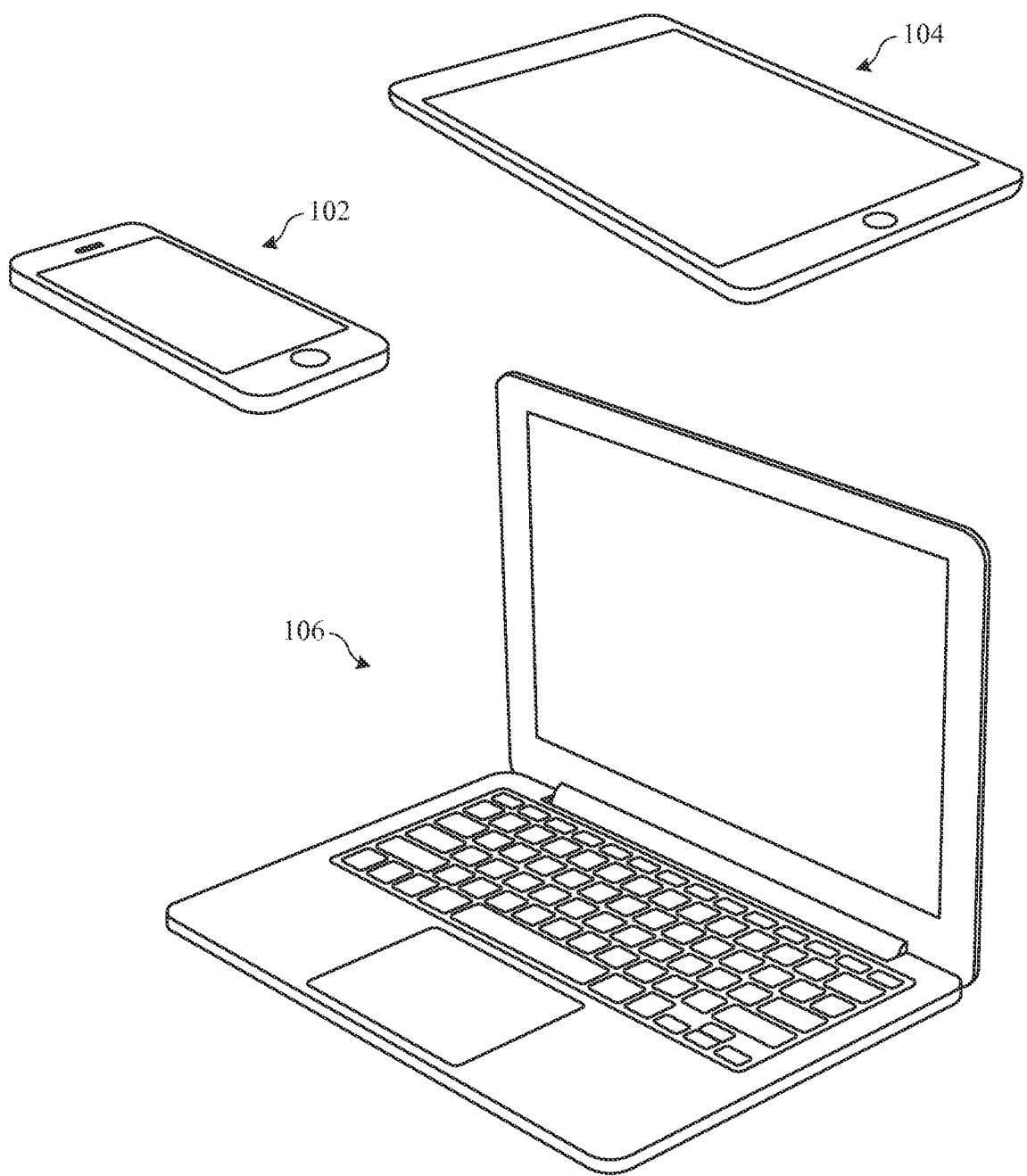
FIG. 1 shows perspective views of devices having surfaces that can be textured, in accordance with some embodiments.

The methods described herein can be used to form aesthetically appealing surface designs and textures on surface of parts, such as consumer products. Lasers have the ability to not only provide aesthetically pleasing but also functional surfaces by creating surface geometries that are difficult or impossible to achieve via blasting. FIG. 1 shows consumer products having surfaces that can be treated using methods described herein, including portable phone 102, tablet computer 104 and portable computer 106. Devices 102, 104 and 106 have housings or enclosures that not only serve to house internal electronic components, but also provide attractive exterior surfaces that provide aesthetic qualities and affect a user's experience. For example, a user can choose one brand of device over another brand based on color, shininess, texture and the general look and feel of exterior surfaces of the device. The exterior surfaces can be made of any suitable material, such as metal, plastic, ceramic, silicone or combinations thereof. In some cases, the exterior surfaces are made of an anodizable metal, such as an aluminum alloy. The anodizable metal can be anodized so that a protective oxide coating is provided over the exterior surfaces.

Figure 2:
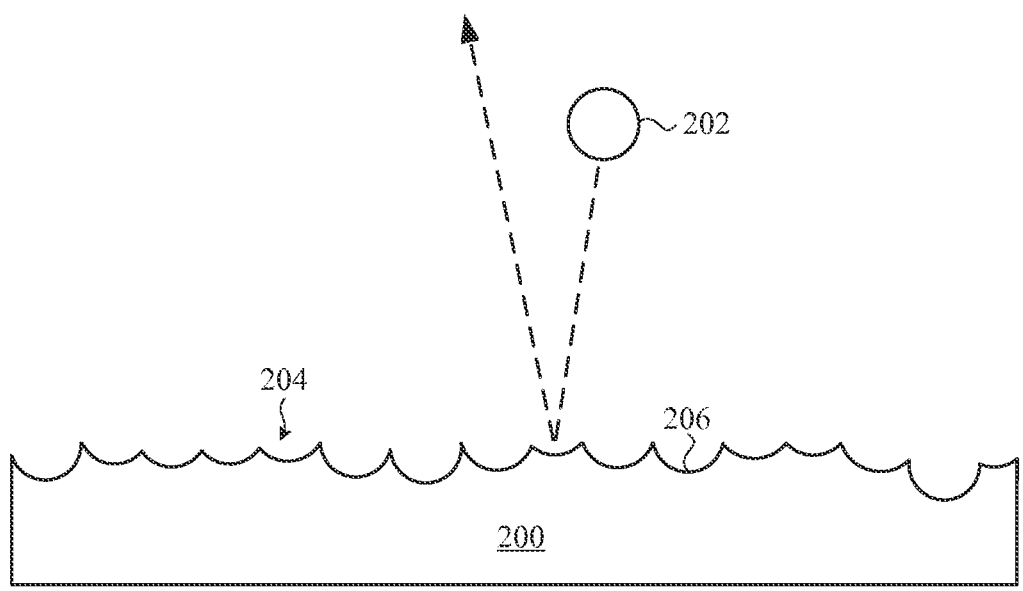
FIG. 2 shows a cross section view of a substrate undergoing a blasting operation.

One common way of providing an aesthetically appealing textured surface involves a blasting operation. FIG. 2 shows a section view of substrate 200 undergoing a blasting operation. Blasting generally involves forcibly propelling a blasting media, which includes many particles 202, against substrate 200 until surface 204 attains a roughness. Particles 202 are generally made of a material that is harder than the material of substrate 200 so that particles 202 create craters 206 on surface 204. For example, minerals such as silica particles 202 can be used to form craters 206 within metal substrates 200. The size (e.g., average diameter) of particles 202 and the force with which particles 202 are propelled against substrate 200 determine the size and depth of craters 206.

One of the disadvantages of using a blasting procedure is the irregularity of roughened surface 204 due to the indiscriminant nature of the blasting process. That is, the precise location and force at which each particle 202 impinges against substrate 200 cannot be controlled. One method of providing some regularity is by blasting substrate 200 with a sufficient amount of particles 202 to average out variations in crater 206 size and depth over an entire surface of substrate 200. However, this only averages out variations on a global scale and does not provide uniformity or control on a localized scale. Additionally, the high pressured blasting media can put very high compressive stresses on substrate 200. If substrate 200 is relatively thin, this large amount of compressive stress can negatively affect the shape of substrate 200. For example, the high pressure can deform substrate 200 such that substrate 200 no longer retains a substantially flat overall shape. This factor can be important in applications where it is desirable to have thin substrates. For example, it may be desirable to have relatively thin walls for enclosures of devices 102, 104 and/or 106 in order to reduce weight. In some cases, substrate 200 can be under a millimeter thick, which can be deformed using some blasting processes depending on the material of substrate 200.

The methods provided herein can provide a textured surface with features that are uniform and repeatable on a global scale as well as on a localized scale. The methods involve the use of a laser that can produce a laser beam with energy sufficient to affect the surface texture of the substrate. The laser beam energy will depend, in part, on the material of the substrate and a desired texture. In some embodiments, the laser beam ablates a portion of the substrate, thereby precisely removing portions of the substrate. In some embodiments, the laser beam melts a portion of the substrate rather than removing material. The melted material can then resolidify with a shiny surface, effectively polishing the surface of the substrate. Lasers can focus energy to very tight spot sizes, enabling precise sculpting of substrates on a micrometer scale. Thus, unlike blasting techniques, one can control the geometries on individual features on a substrate when using a laser. In addition, the high compressive stresses of a blasting operation can be avoided, thereby reducing deformation of a substrate.

Figure 3A:
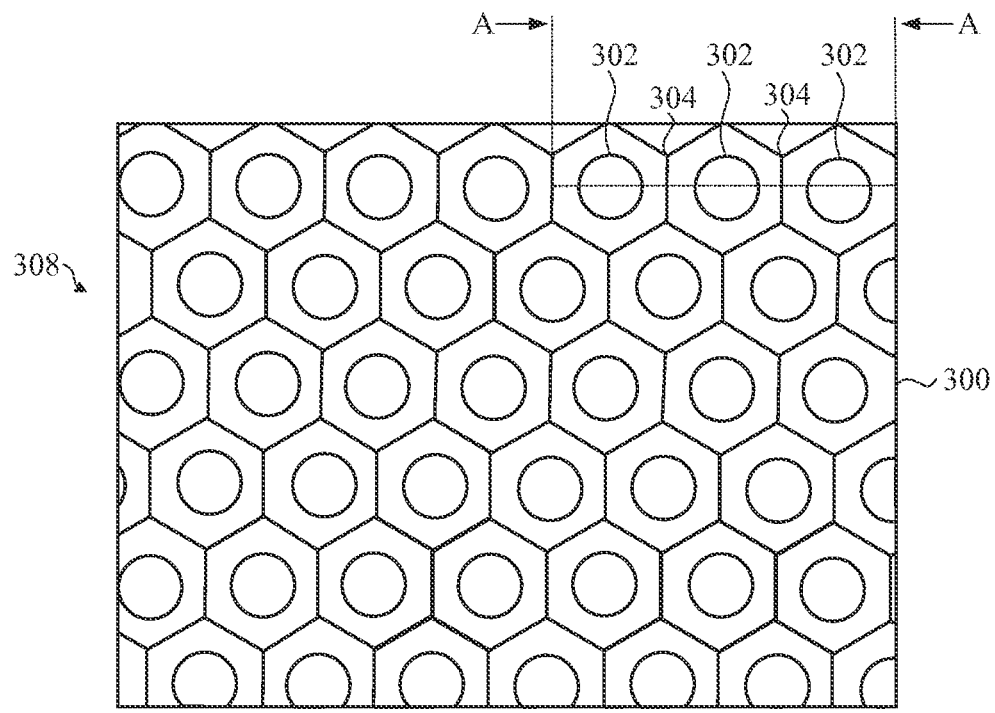
FIGS. 3A and 3B show plan view and cross section view of a substrate with laser formed features, in accordance with some embodiments.
Figure 3B:
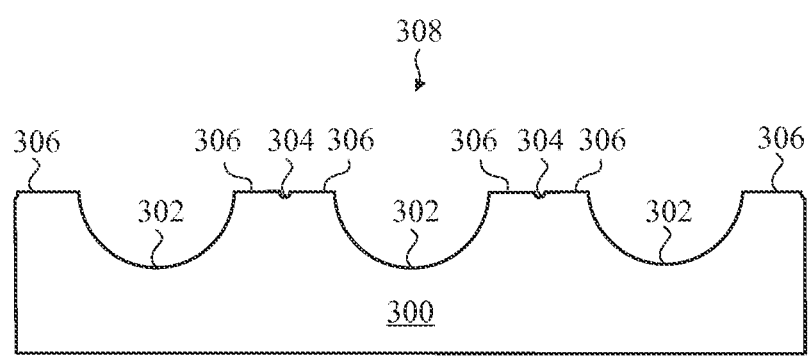

FIGS. 3A and 3B show a plan view and a cross section view, respectively, of part or substrate 300 having features that can be formed using a laser, in accordance with some embodiments. Substrate 300 can be made of any suitable material, including metal, plastic, glass, ceramic or combinations thereof. Surface 308 has multiple features 302 and 304 corresponding to portions of substrate 300 removed by a laser beam, such as by laser ablation. Features 302 are bowl-shaped indentations and features 304 are lines that surround features 302. Areas 306 correspond to portions of substrate 300 substantially unaffected by the laser beam. In some embodiments substrate 300 is polished prior to the laser treatment so that areas 306 are flat, smooth and shiny.

The multiple features 302 and 304 cooperate to form a honeycomb-type pattern on surface 308 to give substrate 300 a particular appearance. Unlike a blasted surface, features 302 and 304 each have a predetermined shape, size and depth and are a predetermined distance apart from one another. This results in design that appears more regular and engineered looking than a blasted surface. In addition, the design is highly repeatable and can be duplicated from substrate to substrate. In some embodiments, the pattern of features 302 and 304 provide a tactile quality to surface 308, such as a more grippable surface compared to a planar surface. The design can be applied to an entire surface 308 of substrate 300 or just a portion of surface 308 of substrate 300.

Any suitable type of laser can be used to form features 302 and 304, including $CO_2$ lasers, solid-state lasers and fiber lasers. The type of laser can depend on the material of substrate 300 and desired shape, size and depth of features 302 and 304. The overall appearance of surface 308 can vary depending on the size and spacing between features 302 and 304. Since a laser beam is used, the width and depth of features 302 and 304 can depend on the spot size and energy of the laser beam, as well as a distance between the laser beam source and substrate 300. These dimensions can be chosen based on design requirements. For example, the size of features 302 and distance between features 302 can be small enough such that features 302 are not individually resolvable by human eye. Features of this small size should be easy to form using many laser systems since the laser beam spot size can be very small.

In other embodiments, the size of features 302 and distance between features 302 are large enough be distinguishable individual features as viewed by human eye. In some embodiments, features 302 are each about 1 mm wide and about 0.25 mm deep. In other embodiments, features 302 are each about 100 micrometers wide and 10 micrometers deep. In other embodiments, features 302 are each range between 100 micrometers and 1 mm wide and 10 micrometers and 0.25 mm deep. In some embodiments, the size and distance between features 302 and 304 are designed to be small enough to increase light reflectance or cause interference effects of light waves incident upon surface 308, which will be described in detail below. In some embodiments, a pulsed laser beam is passed or scanned over surface 308 to form features 302 and 304. In other embodiments, a continuous laser beam is used, with one or more deflectors positioned to deflect the laser beam away from surface 308 when the laser beam reaches areas 306. Features 302 and 304 can be formed using a single pass of the laser beam or multiple passes of the laser beam. The number of passes will depend, in part, on the depth of features 302 and 304.

Figure 4A:
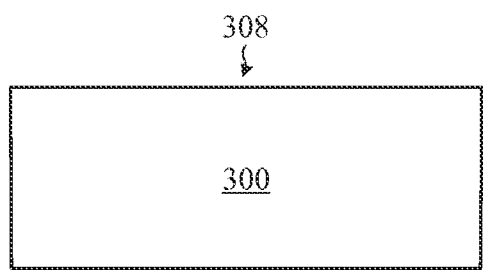
FIGS. 4A-4D show cross section views of showing the substrate of FIGS. 3A and 3B undergoing a multiple pass laser operation, in accordance with some embodiments.
Figure 4B:
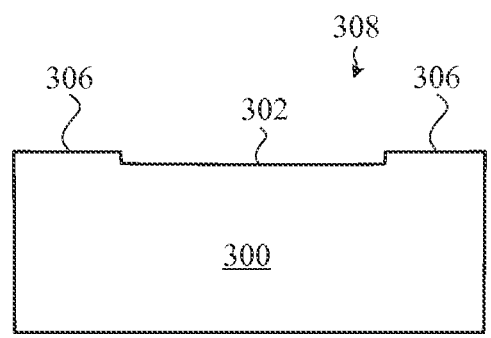
Figure 4C:
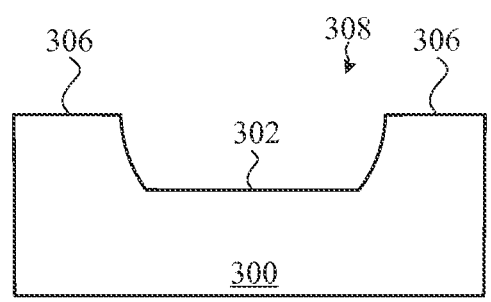
Figure 4D:
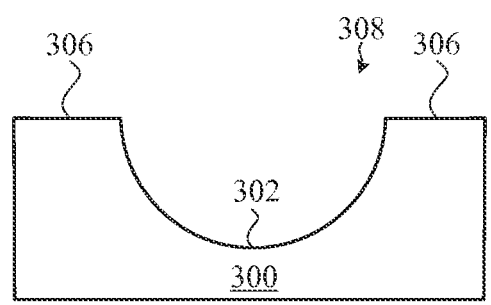

FIGS. 4A-4D show close up views of substrate 300 undergoing a multiple pass laser operation, in accordance with some embodiments. At FIG. 4A, surface 308 of substrate 300 is optionally planarized using, for example, one or more polishing and buffing operations. In some embodiments, surface 308 is alternatively or additionally blasted using one or more blasting operations or other texturing operations (e.g., chemical etching), which is not shown. FIG. 4B shows substrate 300 after a single pass of a laser beam where a portion of substrate 300 is removed. The laser used to produce the laser beam is tuned to only impinge upon surface 308 where feature 302 is being formed while not impinge upon areas 306. The depth of feature 302 at this point can vary depending on the energy of the laser beam and the material of substrate 300. In some embodiments, one laser beam pass forms feature 302 having a depth in the scale of several or tens of micrometers. However, larger depths may be accomplished by tuning laser parameters. FIG. 4C shows substrate 300 after a number of passes of the laser beam, where more material from substrate 300 is removed further deepening feature 302. FIG. 4D shows substrate 300 after even more passes of the laser beam where feature 302 is fully formed.

Note that each of multiple features 302 can be incrementally formed with each pass of the laser beam. Features 304 can similarly be formed with each pass of the laser beam. In this way, an entire area of features 302 and 304 can be incrementally formed with each laser pass. Since features 304 are shallower than features 302, features 304 may be fully formed prior to features 302 being completely formed. That is, formation of shallower features 304 can require less passes of the laser beam. In general, the deeper a desired feature, the more laser passes are required. This incremental process can be referred to as laser depth profiling.

Figure 5A:
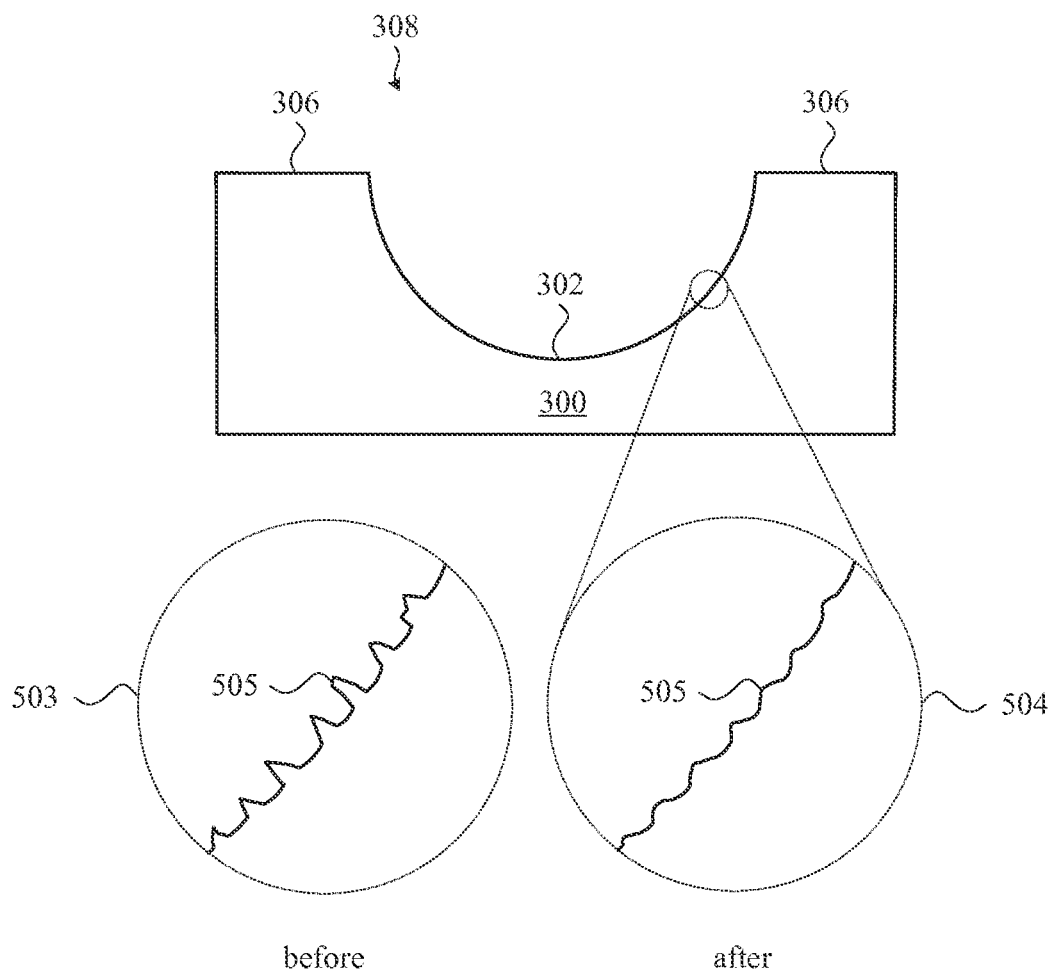
FIGS. 5A-5C shows the substrate of FIGS. 3A, 3B and 4A-4D after surface treatment and anodizing processes, in accordance with some embodiments.
Figure 5B:
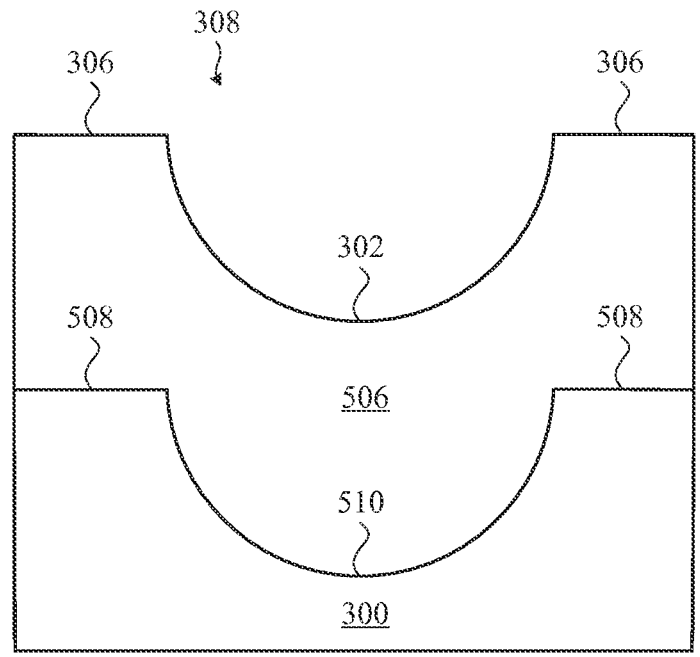
Figure 5C:
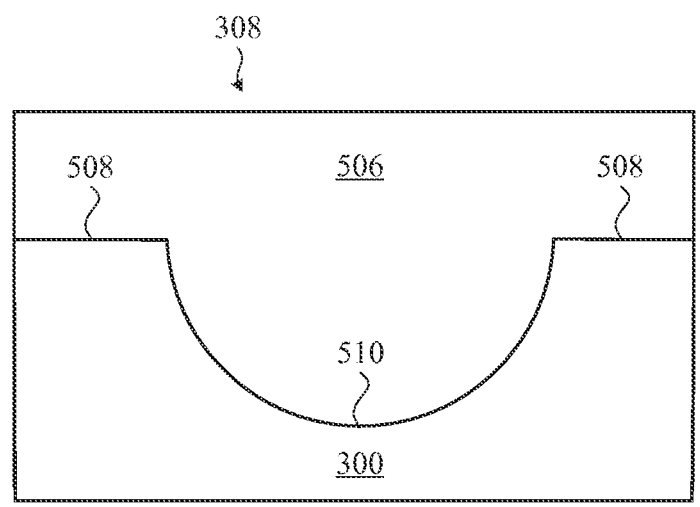

FIGS. 5A-5C show substrate 300 before and after optional surface treatment processes to further change the shape of surface 308. In some cases, some of the surface treatment processes are performed prior to an anodizing process, and are therefore sometimes referred to as pre-anodizing processes. FIG. 5A shows substrate 300 with feature 302 formed therein. Insets 503 and 504 show close up views of portions of surface 308 before and after, respectively, an optional surface polishing operation. Suitable surface polishing can include chemical polishing, electropolishing and/or laser polishing. Inset 503 shows microscopic jagged peaks 505 along surface 308 including along feature 302 and areas 306. Inset 504 shows how a polishing operation can smooth peaks 505 round and smooth out peaks 505, creating a more uniform surface 308. After polishing, rounded peaks 505 can specularly reflect more light compared to prior to the polishing, thereby increasing the shininess and glossiness of surface 308. Chemical polishing generally involves exposing surface 308 to a chemical agent that preferentially removes material at peaks 505, thereby smoothing out non-uniformities. Electropolishing involves subjecting substrate 300 to an electrolytic operation. For example, substrate 300 can be immersed in an electrolytic bath where substrate 300 serves as an anode. When current is passed through the substrate 300 anode and corresponding cathode, material at peaks 505 become preferentially oxidized and removed. Laser polishing can also smooth out non-uniformities by applying a relatively low amount of energy to surface 308. The lower laser energy can be sufficient locally melt surface 308 without substantially ablating the material of substrate 300. Details of some laser polishing operations are described in detail below with reference to FIGS. 11A-11C and 12A-12C.

In some embodiments, substrate 300 is optionally alternatively or additionally subjected to one or more etching operations (not shown). The etching operation can include exposing surface 308 to an acid or alkaline etching solution that selectively removes small amounts of material on a microscopic level, such as along metal grain boundaries if substrate 300 is made of metal. This gives surface 308 a matte appearance. In some embodiments, surface 308 is treated with a combination of polishing and etching operations to give surface 308 a combination of glossy and matte appearance, sometimes referred to as a "satin" look.

In some embodiments where substrate 300 includes an anodizable material, such as aluminum, substrate 300 can undergo an anodizing operation. FIG. 5B shows substrate 300 after an anodizing process, in accordance with some embodiments. Anodizing involves electrolytically converting a portion of substrate 300 to a corresponding metal oxide layer 506, with unconverted portion of substrate 300 positioned below metal oxide layer 506. In this way, metal oxide layer 506 serves as a coating for substrate 300 and surface 308 corresponds as an exterior surface of substrate 300. The unconverted portion of substrate 300 has feature 510 having a corresponding shape as feature 302 and area 508 having a corresponding shape as area 306. In some embodiments, the anodizing process can be chosen to provide a particular physical property and/or appearance to substrate 300 as viewed from surface 308. For example, the anodizing process parameters can be chosen to give metal oxide layer 506 a predetermined thickness, hardness and/or durability. In some embodiments, metal oxide layer 506 is made to have a predetermined amount of light transparency such that most of the visible light incident on metal oxide layer 506 shines through metal oxide layer 506 and reaches underlying substrate 300. In this way, feature 510 can be visible through metal oxide layer 506, including gloss, matte or statin appearance provided by any surface treatment operation. Thus, metal oxide layer 506 can be said to have the textured appearance of the substrate 300. In some embodiments, curvatures of metal oxide layer 506 are designed to act as a sort of lens and focus incoming light to different portions of underlying substrate 300, such as proximate to features 510.

FIG. 5C shows substrate 300 after an optional metal oxide layer 506 polishing operation. The polishing operation can include a mechanical polishing and/or buffing operation and can give surface 308 a substantially planar geometry. In some embodiments, metal oxide layer 506 is polished to have a shiny exterior surface. If metal oxide layer 506 is transparent enough, the surface geometry feature 510 and areas 508 can be seen through metal oxide layer 506, including gloss, matte or satin appearance provided by any surface treatment operation.

Figure 6A:
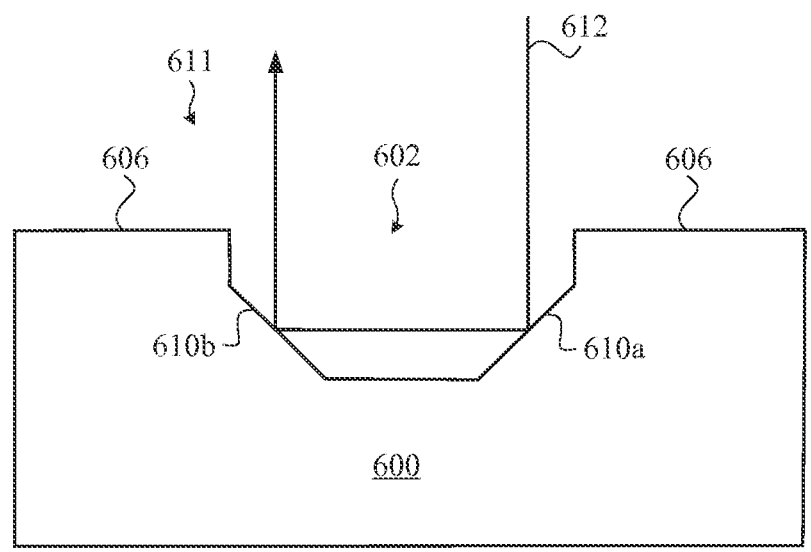
FIGS. 6A-6D show cross section views and a plan view of a substrate that includes faceted features, in accordance with some embodiments.
Figure 6B:
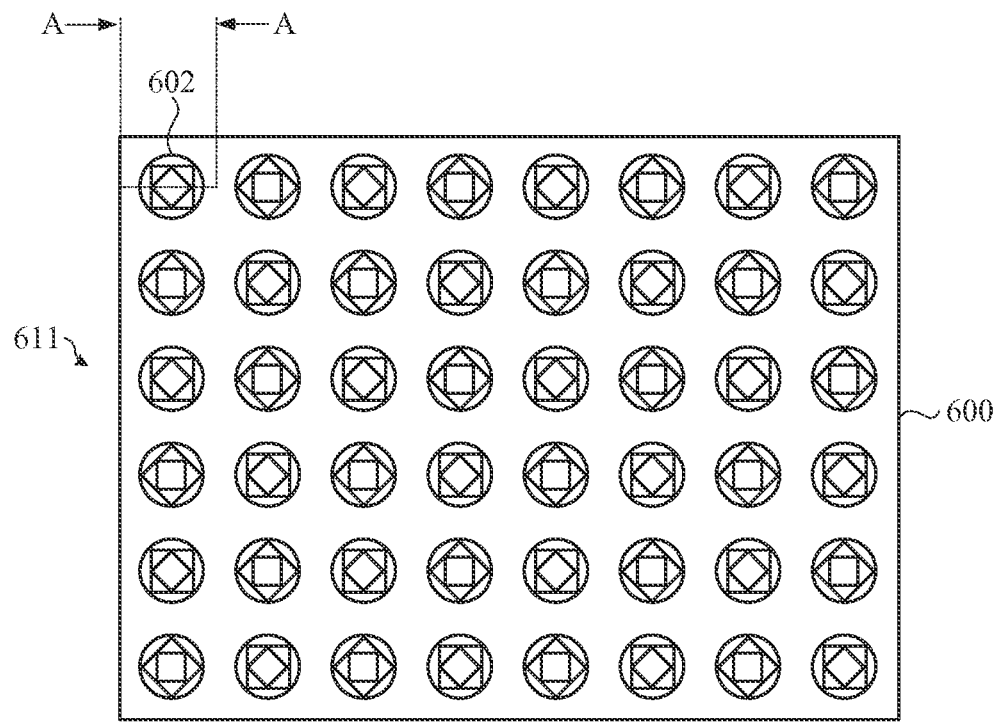
Figure 6C:
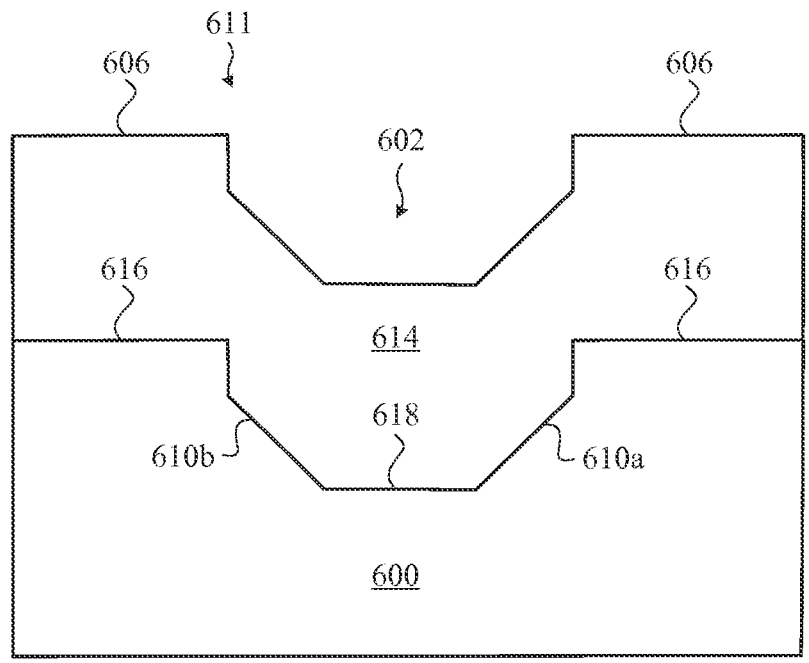
Figure 6D:
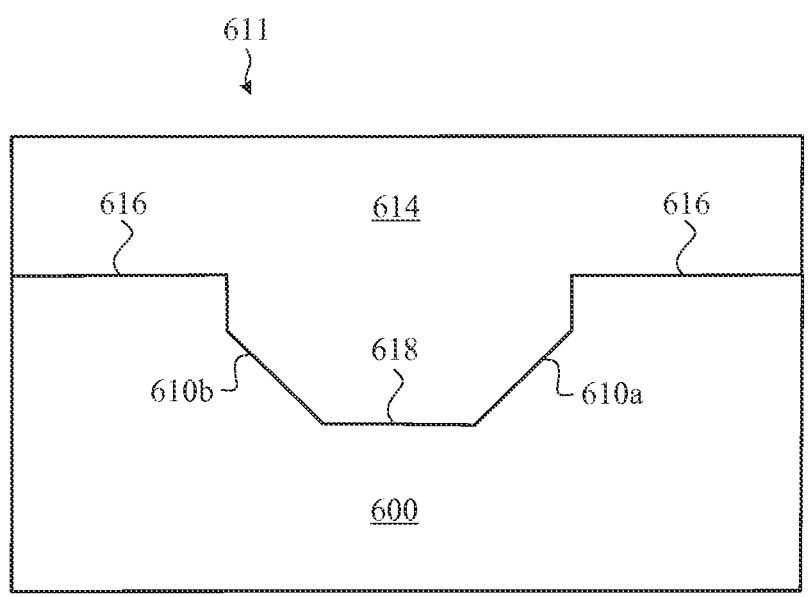

As described above, laser beam profiling or sculpting can be used to form a vast number of different geometries within a substrate, providing an almost endless amount of designs options. As described above, the geometries can be specifically designed to affect the way light interacts with the substrate and give the substrate a unique appearance. FIGS. 6A-6C show cross section views and plan views of substrate 600 that includes faceted feature(s) 602, in accordance with some embodiments. As shown in FIG. 6A, faceted feature 602 includes facets 610a and 610b that are substantially flat surfaces and that are positioned to reflect incoming light. That is, the depth of feature 602 and angles of facets 610a and 610b relative to surface 606 can be chosen to maximize the reflection of incident light back out of feature 602. For example, light ray 612 entering feature 602 can reflect off of facet 610a, then off of facet 610b, and back out of feature 602. In this way, light incident upon surface 611 of substrate 600 can be reflected by feature 602, giving feature 602 a sparkling appearance similar to a faceted diamond. The color of the light reflected will depend on the wavelength of the light source, and in some cases the material of substrate 600. Facets 610a and 610b can be formed using laser depth profiling, such as described above with reference to FIGS. 4A-4D. Substantially each of features 602 can have a predetermined number of facets 610a and 610b and/or be at a predetermined angle with respect surface 606, which would not be possible using a blasting process.

On a larger scale, substrate 600 can include multiple features 602, such as shown in the plan view of FIG. 6B. Each of features 602 has light reflective facets 610a and 610b that give surface 611 multiple intensified reflection points. The size (e.g., diameter and depth) of features 602 and distance between features 602 can vary depending on design choice. In some embodiments, the diameter of each feature 602 is substantially the same. In other embodiments, the diameters of features 602 vary. In some embodiments, the average diameter of features 602 is small enough such that features 602 are not individually resolvable by human eye. In this case, features 602 will appear as points of sparkle but facets 610a and 610b will not be resolvable. In other embodiments, the average diameter of features 602 is large enough be distinguishable individual features as viewed by human eye. Features 602 can exist over an entire surface 611 of substrate 600 or only in certain areas of surface 611.

If substrate 600 is made of an anodizable material, substrate 600 can optionally be exposed to an anodizing process, as shown in the cross section view of FIG. 6C. Note that prior to the anodizing process, substrate 600 can optionally undergo one or more pre-anodizing surface treatment operations (e.g., chemical polishing, electropolishing, laser polishing and/or etching) in order to modify the geometry of surface 611 on a micro-level. For example, a polishing operation can be used to smooth out microscopic non-uniformities and increase the specular reflectance of surface 611, as described above with respect to FIG. 5A. The anodizing process converts a portion of substrate 600 to a corresponding metal oxide layer 614. The portion of substrate 600 that is unconverted remains below metal oxide layer 614 and has feature 618 having a shape corresponding to feature 602 and surface 616 having a shape corresponding to surface 606. In some embodiments, the shape of metal oxide layer 614 is such that incoming light (e.g., light ray 612) is focused toward feature 618, thereby further intensifying the amount of light reflected off of feature 618. That is, metal oxide layer 614 can act as a sort of lens. Metal oxide layer 614 can be substantially transparent such that facets 610a and 610b reflect incoming light in substantially the same manner as described above with reference to FIG. 6A. At FIG. 6D, metal oxide layer 614 is optionally planarized such that surface 611 is substantially smooth and flat.

Figure 7A:
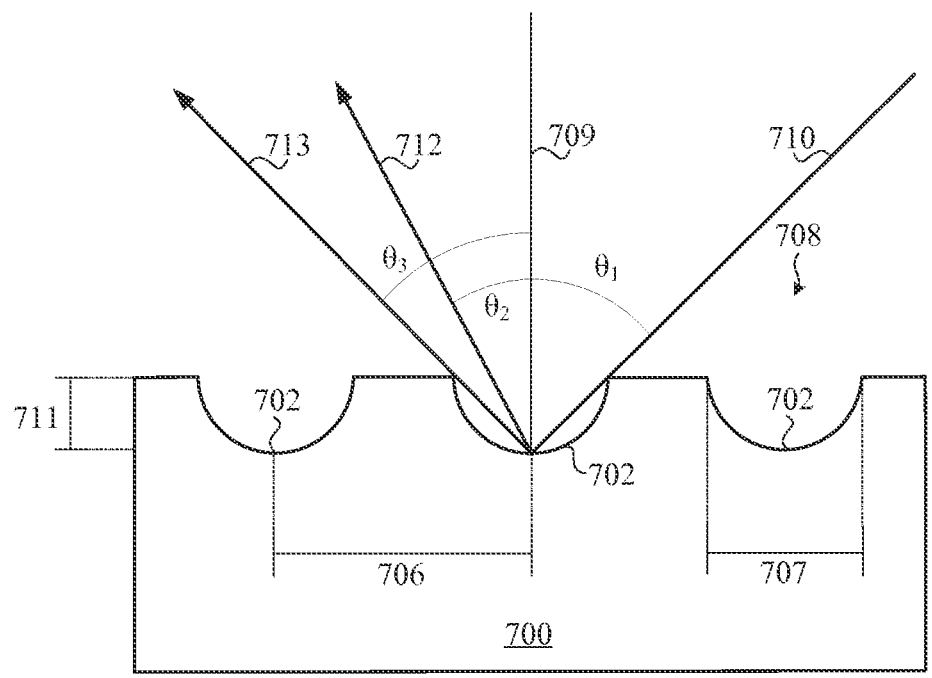
FIGS. 7A-7C show cross section views of a substrate having light diffracting features, in accordance with some embodiments.
Figure 7B:
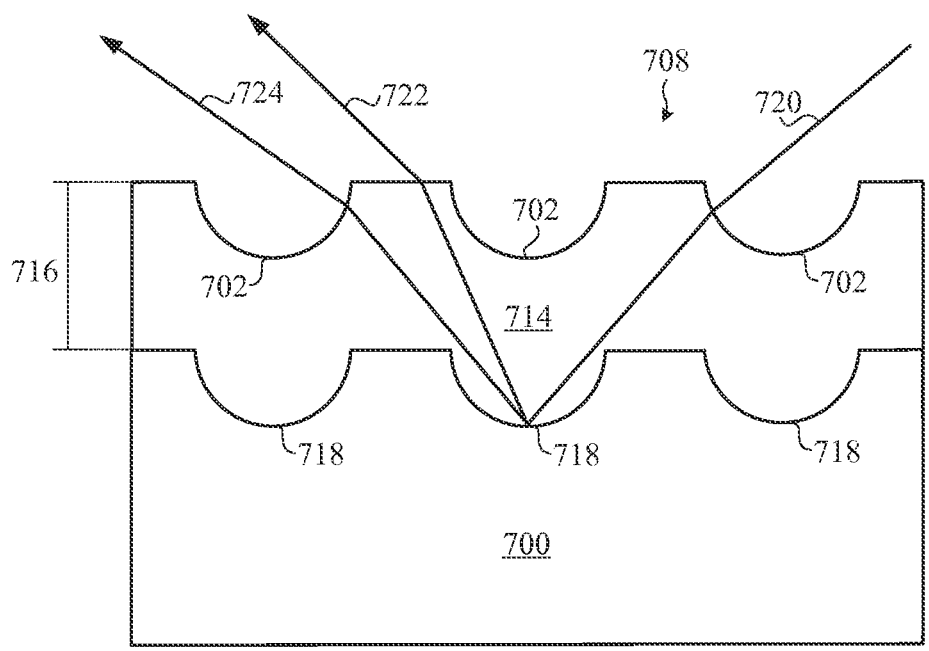
Figure 7C:
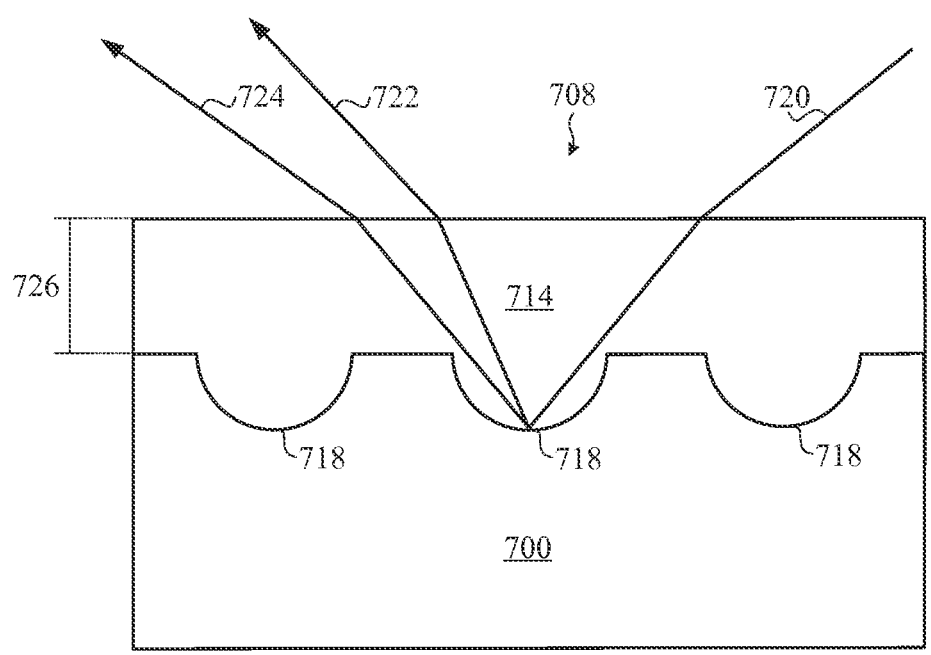

In some cases, the features on a substrate are designed to diffract incoming light and produce reflected light having different colors. FIGS. 7A-7C show cross section views of substrate 700 having different light diffracting features, in accordance with some embodiments. In general, light diffraction occurs when light encounters an object with a size comparable to its wavelength. FIG. 7A shows substrate 700 having features 702 arranged to diffract light. Features 702 can each be formed using a laser process, such as a laser depth profiling process described above. Features 702 have reflective surfaces and are spaced apart from one another by distance 706. Width 707 and depth 711 of features 702 and/or distance 706 between features 702 are chosen to cause diffraction and interference effects of incident light. That is, features 702 can be a predetermined size and a predetermined distance apart from one another to diffract the incident light.

For example, incident light ray 710 impinges on feature 702 at angle $\theta_1$ relative to surface normal 709. Features 702 reflect and diffracts incident light ray 710 as light ray 712 reflected at angle $\theta_2$ relative to surface normal 709, and light ray 713 reflected at angle $\theta_3$ relative to surface normal 709. Light ray 712 and light ray 713 reflecting at different angles can impart different colors or a "rainbow" effect to surface 708. In some embodiments, this can manifest as visible dots or points of color on surface 708. The width 707 and distance 706 can be chosen to create a particular light diffraction and interference effects. In some embodiments, width 707 and depth 711 of features 702 and/or distance 706 between features 702 are chosen to create different visual effects based on the angle at which substrate 700 is held. In some cases, the colors of the dots or points of color can change depending on the angle at which substrate 700 is viewed. For example, surface 708 may have a bluish hue when viewed at a first angle and have a reddish hue when viewed at a second angle.

Substrate 700 can be made of any suitable material. In some embodiments where substrate 700 is made of an anodizable material, substrate 700 is exposed to an anodizing process, as shown in FIG. 7B. Note that prior to the anodizing process, substrate 700 can optionally undergo one or more surface treatment operations (e.g., chemical polishing, electropolishing, laser polishing and/or etching). In some embodiments, a polishing operation is performed in order to smooth out microscopic non-uniformities and increase the specular reflectance of surface 708, as described above with respect to FIG. 5A. The anodizing process converts a portion of substrate 700 to a corresponding metal oxide layer 714. The portion of substrate 700 that is unconverted remains below metal oxide layer 714 and has features 718 having shapes corresponding to features 702. Metal oxide layer 714 can be substantially transparent such that light incident on surface 708 can pass through metal oxide layer 714 and diffract and/or interfere with features 718 of underlying substrate 700, thereby retaining the light diffraction and interference effects described above.

In addition to controlling the clarity of metal oxide layer 714, thickness 716 of metal oxide layer 714 can be adjusted to add to or create other visual effects. For example, incident light ray 720 is refracted by surface 708 entering metal oxide layer 714, diffracts off of feature 718 of substrate 700 as light rays 722 and 724, which are each refracted by surface 708 exiting metal oxide layer 714. In some cases, the light refraction caused by metal oxide layer 714 can cause interference of reflected light rays 722 and 724, thereby causing surface 708 to take on different hues. In some embodiments, thickness 716 is chosen to achieve a predetermined amount of refraction and/or interference of light incident surface 708. At FIG. 7C, metal oxide layer 714 is optionally planarized such that surface 708 is substantially smooth and flat. The planarizing process can be chosen to reduce the thickness of metal oxide layer 714 to a chosen thickness 726 to create a desired visual effect. In some embodiments, the shape of metal oxide layer 714 is such that incoming light (e.g., light ray 720) is focused toward feature 718, thereby further intensifying the amount of light reflected off of feature 718. That is, metal oxide layer 714 can act as a sort of lens.

Figure 8A:
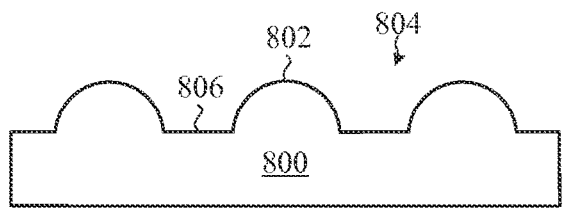
FIGS. 8A-8E show cross section views of substrates having different laser-formed features, in accordance with some embodiments.
Figure 8B:
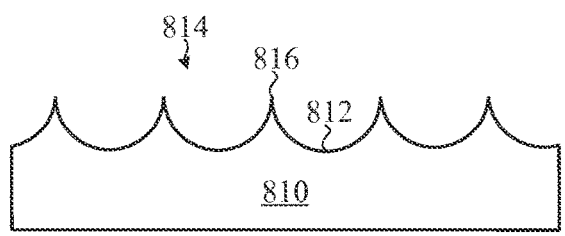
Figure 8C:
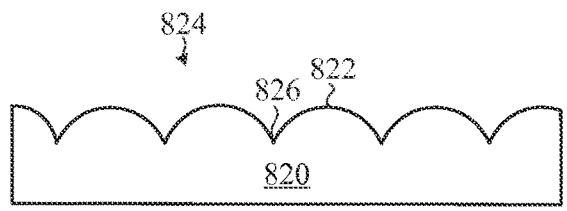
Figure 8D:
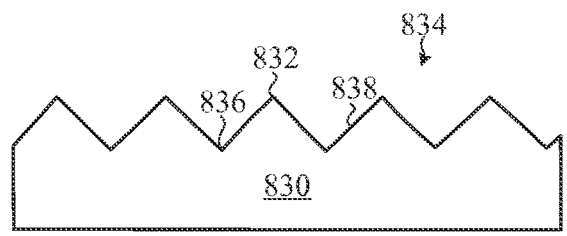
Figure 8E:
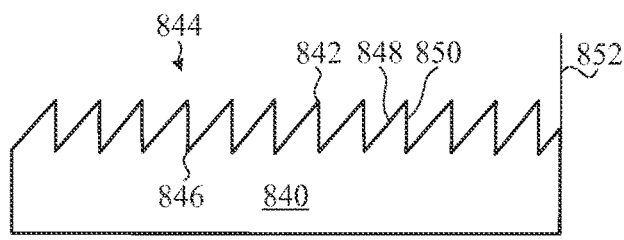

The laser forming methods described herein can be used to form features having any suitable geometries and are not limited by the above-described geometries. FIGS. 8A-8E show cross section views of substrates having different laser-formed geometries in accordance with some embodiments. FIG. 8A shows substrate 800 having surface 804 with features 802 that are in the form of curved protrusions. Substantially flat areas 806 separate features 802 from each other. FIG. 8B shows substrate 810 having surface 814 with features 812 in that are curved indentations. Features 812 are positioned close to each other such that sharp peaks 816 are formed on surface 814. FIG. 8C shows substrate 820 with surface 824 with features 822 that are curved protrusions that are positioned close to each other, forming sharp indentations 826. FIG. 8D shows substrate 830 having surface 834 with features 832 in the form of peaks. Features 832 (peaks) and valleys 836 are defined by substantially flat surfaces 838. FIG. 8E shows substrate 840 having surface 844 with features 842 corresponding to sharp peaks with intervening valleys 846. Flat surfaces 848 and 850 are at different angles relative to surface normal 852.

The features shown in FIGS. 8A-8E can be any suitable size (e.g., diameter and depth) and distance apart from each other, depending on design choice and on any desired optical effects. For example, the features may be small enough and/or spaced close enough to cause light diffraction/interference effects. Although the features shown in each of FIGS. 8A-8E appear substantially the same size, shape and distance apart, this is not meant to exclude other embodiments where the features are of different size, shape and distance from each other. For example, a substrate can have a combination of sharp peaks/valley as well as curved protrusions and/or indentations. One of skill in the art would recognize that any suitable combination could be used to provide a desired appearance.

Figure 9A:
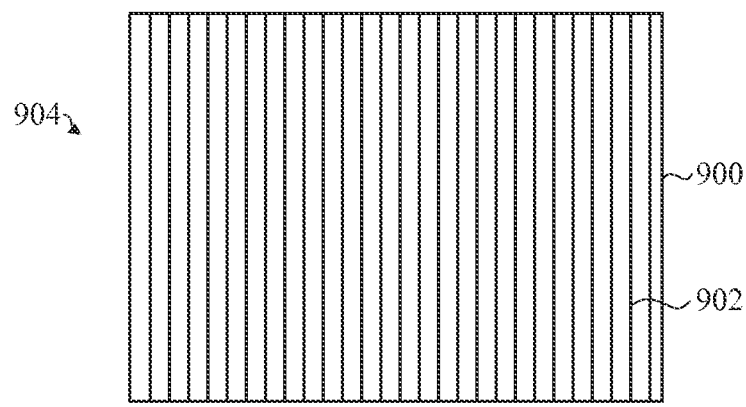
FIGS. 9A-9C show plan views of substrates having different laser-formed designs, in accordance with some embodiments.
Figure 9B:
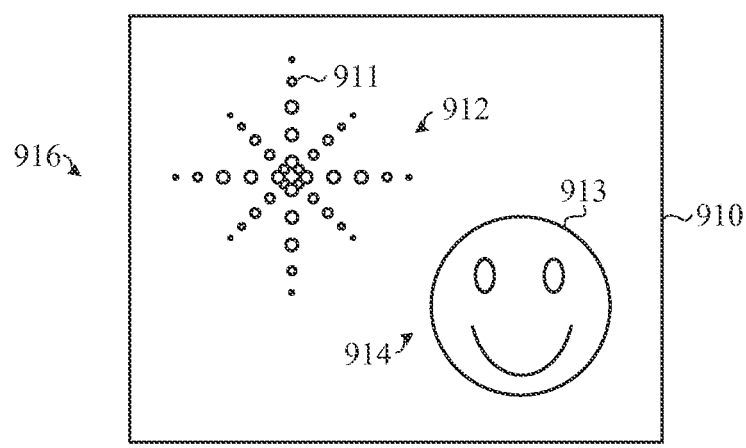
Figure 9C:
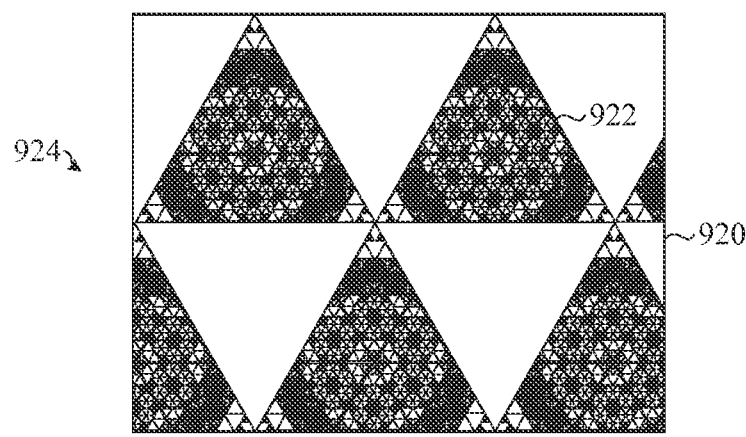

The laser forming methods described herein can be used to form features that cooperate together to form a particular design on a substrate. FIGS. 9A-9C show plan views of substrates having different laser-formed features that form designs, in accordance with some embodiments. FIG. 9A shows substrate 900 with parallel lines 902 along surface 904 using a laser process. In some embodiments, scanning a continuous laser beam across surface 904 forms lines 902. In other embodiments, a pulsed laser beam is used. In some embodiments, each of lines 902 are reflective trenches having a similar cross section as feature 702 or 718 in FIGS. 7A-7C. Lines 902 can be spaced apart from each other at small enough distances that lines 902 act as a diffraction grating, thereby imparting colors to surface 904 with the colors shifting depending on the viewing angle of surface 904. In other embodiments, the lines form other geometric shapes, such concentric circles.

FIG. 9B shows substrate 910 with designs 912 and 914 on surface 916 formed using laser processes described herein. Design 912 includes a combination of individual circular shaped features 911 arranged in a symmetric design. As shown, features 911 can have different diameters. In some embodiments, features 911 are indentations within substrate 910 having the same or different depths. In some embodiments, some or all of features 911 have light reflective facets, such as described above with reference to FIGS. 6A-6D, giving design 912 a sparkling appearance. Design 914 includes laser formed curved lines 913 that combine to form a symbol—in this case eyes, mouth and head of a smiley face. Curved lines 913 can be formed by scanning a continuous or pulsed laser beam along surface 916.

FIG. 9C shows substrate 920 with lines 922 that combine to form a complex pattern, such as a fractal pattern, on surface 924. The complex pattern on substrate 920 illustrates how a laser can create complex geometries that cannot be accomplished using blasting or etching. Note that the embodiments illustrated in FIGS. 9A-9C are not meant to limit the possibilities within the scope of the present invention. On the contrary, FIGS. 9A-9C illustrate how the laser texturing processes described herein can produce light diffracting features, light reflecting features, repeatable shapes, complex shapes, superimposed shapes, and an almost limitless possibility of combination of light interacting features and geometric shapes to provide a desired design on a substrate.

The substrates shown in FIGS. 8A-8E and 9A-9C can be treated with one or more above-described additional surface treatment operations, such as pre-anodizing processes, in order to provide additional visual effects. For example, chemical polishing, electropolishing and/or laser polishing can be used to smooth out microscopic non-uniformities and increase specular reflectance of the substrate surfaces. Alternatively or additionally, a micro-etching process can add a matte or satin appearance to the substrate surfaces, as described above.

The substrates shown in FIGS. 8A-8E and 9A-9C can be anodized, if appropriate. Anodizing forms a metal oxide layer that can serve as a protective coating for the substrates. In some embodiments, the anodizing process is tailored based on the geometries of the features and a desired visual affect, such as light refraction effects, that can add to visual effects provided by an underlying substrate.

Figure 10:
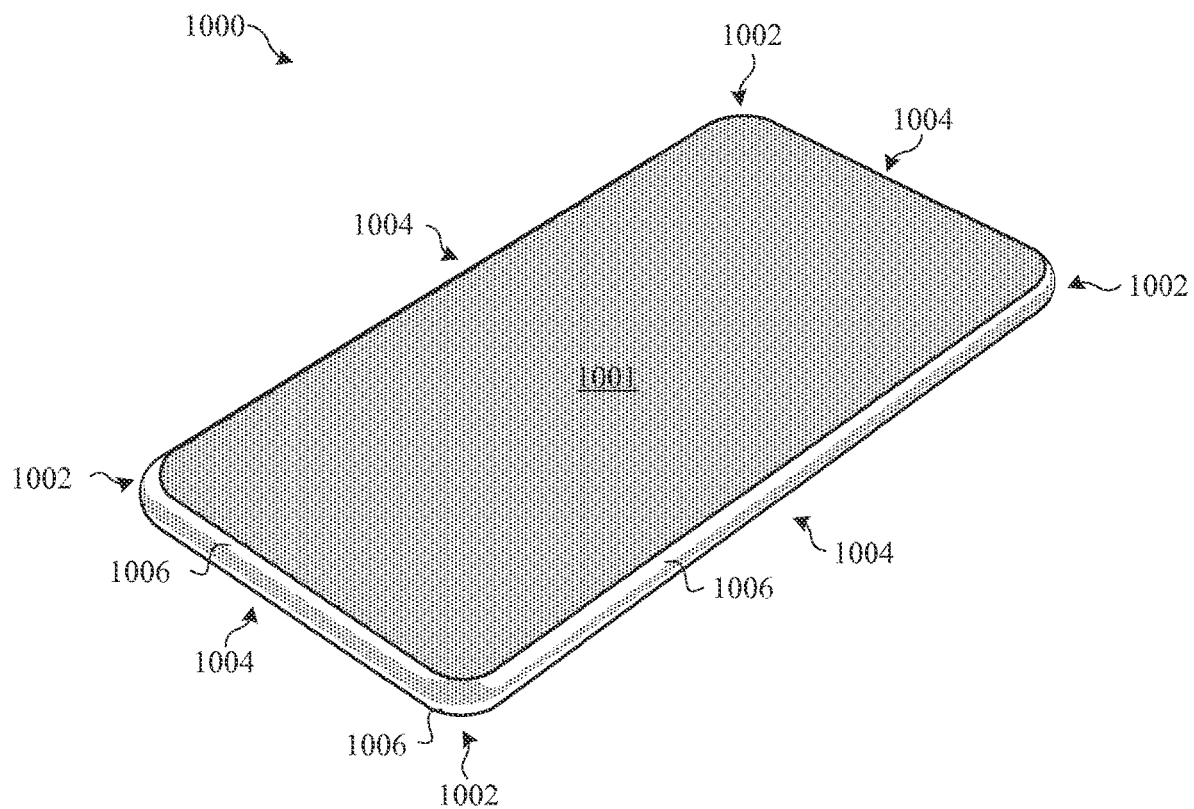
FIG. 10 shows a perspective view of a substrate with a flat surface, curved corners and curved edges that can be laser treated to provide unique visual effects, in accordance with some embodiments.

In some embodiments, a substrate has curves, edges or other structures that reflect light different than flat surfaces of the substrate. To illustrate, FIG. 10 shows a perspective view of substrate 1000, which includes flat surface 1001, curved corners 1002 and curved edges 1004. Substrate 1000 can correspond to a housing for an electronic device. As viewed by an observer, curved corners 1002 and curved edges 1004 will appear glossier than flat surface 1001, sometimes referred to as specular highlights 1006. This is due to how curved corners 1002 and curved edges 1004 capture and reflect incident light compared to flat surface 1001.

In some embodiments, the surfaces of substrate 1000 are altered to increase or decrease this specular highlight phenomenon. For example, curved corners 1002 and curved edges 1004 can be treated to intensify the visible difference between curved corners 1002/edges 1004 compared to flat surface 1001. One way of accomplishing this is by forming multiple faceted features that each intensify the amount of reflected light at curved corners 1002 and curved edges 1004, such as described above with reference to FIGS. 6A-6D. If flat surface 1001 does not have faceted features, curved corners 1002 and curved edges 1004 can appear even brighter than provided by specular highlighting alone. In other embodiments, flat surface 1001 can have multiple faceted features that each intensify reflected light, while curved corners 1002 and curved edges 1004 do not have faceted features. This can give substrate 1000 unique look since the brightness of flat surface 1001 can appear the same as or greater than the brightness of curved corners 1002 and curved edges 1004 due to specular highlighting. Laser texturing on curved surfaces such as curved corners 1002 and curved edges 1004, can be accomplished by mounting substrate 1000 or the laser on a 5-axis system so that their relative positions can be adjusted and the direction of the laser beam can be controlled in three dimensions.

In some embodiments, the surfaces of substrate 1000 are altered to provide diffraction-related colors to substrate 1000. For example, curved corners 1002 and/or curved edges 1004 can be laser treated to have multiple light diffracting features, such as described above with reference to FIGS. 7A-7C, or a diffraction grating, such as described above with respect to FIG. 9A. Alternatively or additionally, flat surface 1001 can be laser treated to have multiple light diffracting features or a diffraction grating. In some embodiments, one or more of flat surface 1001, curved corners 1002 and curved edges 1004 have a combination of light diffracting features/diffraction grating and light reflective faceted features. In some embodiments, texture differences between flat surface 1001 and curved corners 1002/edges 1004 are gradual such that there is no visibly distinct transition between varying textured surfaces.

Flat surface 1001 and curved corners 1002/edges 1004 of substrate 1000 can be treated with one or more above-described surface treatment operations in order to provide additional visual effects. In some cases, the type of surface treatment will vary depending upon the type of laser texture and a desired final surface texture. For example, surface 1001 or curved corners 1002/edges 1004 can be polished using chemical, electrochemical and/or laser polishing to increase its specular reflectance or chemically etched to decrease its specular reflectance. If substrate 1000 is anodizable, it can be anodized to provide a protective metal oxide layer on substrate 1000. In some cases, the metal oxide layer is designed to add visual effects, such as light refraction effects described above with respect to FIGS. 7A-7C.

Note that corners 1002 and edges 1004 can be charge concentrators during the anodizing process. Therefore, the metal oxide layer over corners 1002 and edges 1004 tends to grow faster and end up being thicker. Thus, in some embodiments, more or different types of laser features are formed at flat surface 1001 compared to corners 1002 and edges 1004 to increase the rate of anodizing at flat surface 1001. This can create a metal oxide layer having a more uniform thickness across flat surface 1001, corners 1002 and edges 1004.

Figure 11A:
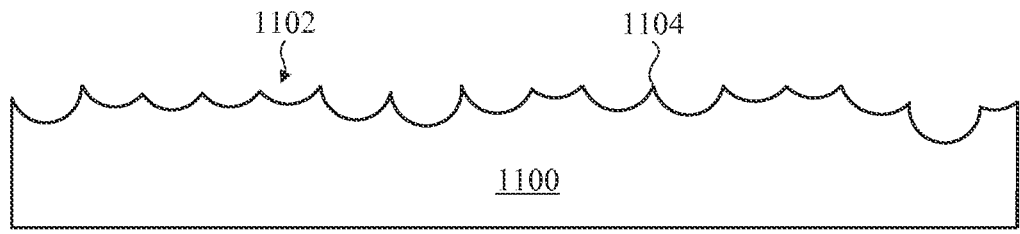
FIGS. 11A-11C show cross section views and a plan view of a substrate undergoing a laser polishing process, in accordance with some embodiments.
Figure 11B:
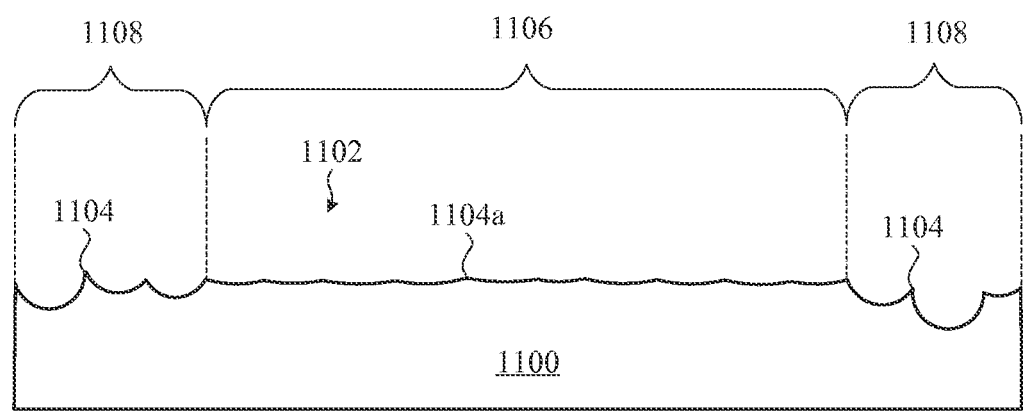
Figure 11C:
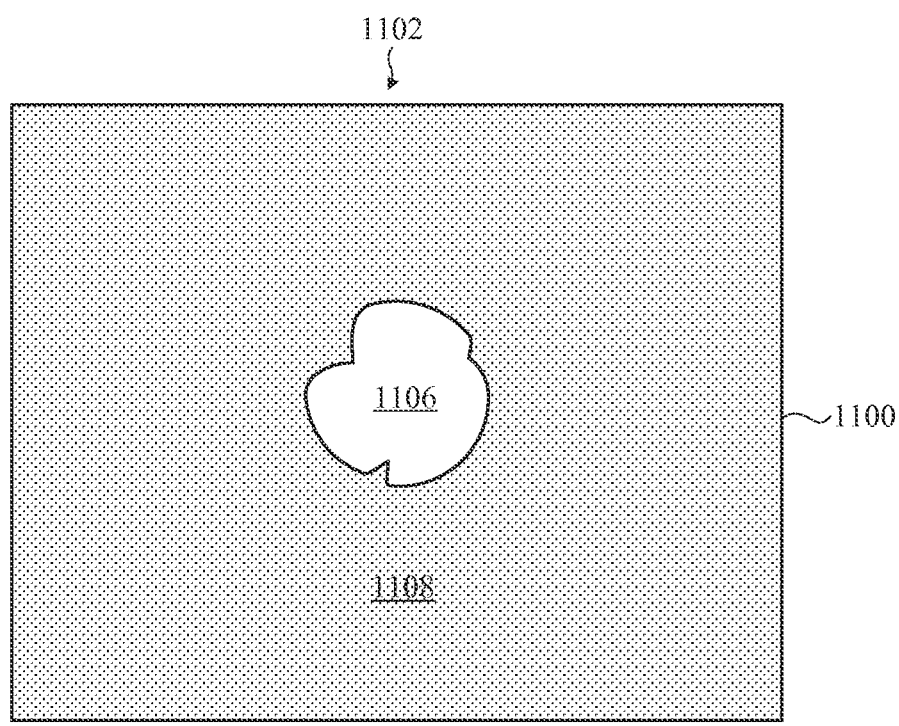

As previously described, laser polishing can be used to smooth a surface of a substrate, in addition to or instead of other polishing operations such as chemical polishing and electropolishing. FIGS. 11A-11C show cross section views and a plan view of substrate 1100 undergoing a laser polishing process in accordance with some embodiments. FIG. 11A shows a close up cross section view of substrate 1100 prior to the laser polishing operation. Surface 1102 of substrate 1100 is uneven, such a blasted surface formed by impingement of blasting media. Surface 1102 has multiple peaks 1104 that can give surface 1102 a dull or matte appearance. It should be noted that the laser polishing process described herein are not limited to blasted surfaces and that a surface having any suitable geometry for polishing can be used.

FIG. 11B shows a cross section view of substrate 1100 after portion 1106 of surface 1102 is treated using a laser polishing operation. Laser polishing involves directing a laser beam having a relatively low energy at surface 1102, specifically at portion 1106. Remainder portion 1108 of surface 1102 is substantially unaffected by the laser polishing operation, therefore retains a blasted surface texture with peaks 1104. The relatively low energy laser beam locally melts the material of substrate 1100 at portion 1106 without substantially ablating it, which causes peaks 1104 to round out (illustrated as rounded peaks 1104a) or to disappear altogether. The material at portion 1106 then re-solidifies with the rounded peaks 1104a or substantially no peaks. As a result, portion 1106 will specularly reflect light incident on surface 1102 more than remainder portion 1108. That is, portion 1106 will be shinier and glossier than remainder portion 1108. In some embodiments, portion 1106 is laser polished to a mirror shine. In addition, portion 1106 can be tactilely smoother than remainder portion 1108.

FIG. 11C shows a plan view of substrate 1100 after the laser polishing operation. As shown, laser polished portion 1106 can be in the form of a symbol or icon that is visually distinguishable from remainder portion 1108 that is left unpolished. It should be noted that portion 1106 could have any suitable shape and size based on the capabilities of the laser used for the polishing operation. For example, portion 1106 can be in the shape of text or as a regular pattern of dots or lines adjacent to remainder portion 1108.

Any suitable type of laser can be used for laser polishing, including a $CO_2$ laser, solid-state laser or fiber laser. The laser beam can be a pulsed laser beam or a continuous laser beam. The lower energy laser beam sufficient for laser polishing without ablation can be accomplished by adjusting the laser power, the laser beam duration/pulse, or a combination thereof. The type of adjustment will depend, in part, on the type of laser and the material of substrate 1100. These adjustments can also be used to control an amount of melting of substrate 1100. In this way, laser polishing can accomplish unique polishing effects that may not be attainable using traditional chemical and/or electrochemical polishing operations.

Figure 12A:
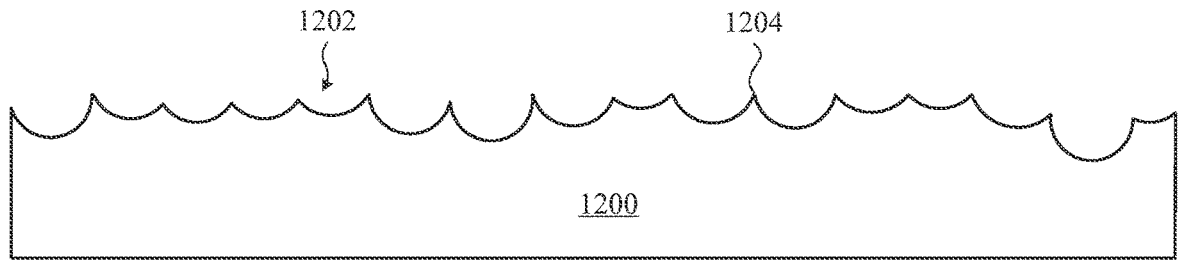
FIGS. 12A-12C show cross section views and a plan view of a substrate undergoing an alternative laser polishing process, in accordance with some embodiments.
Figure 12B:
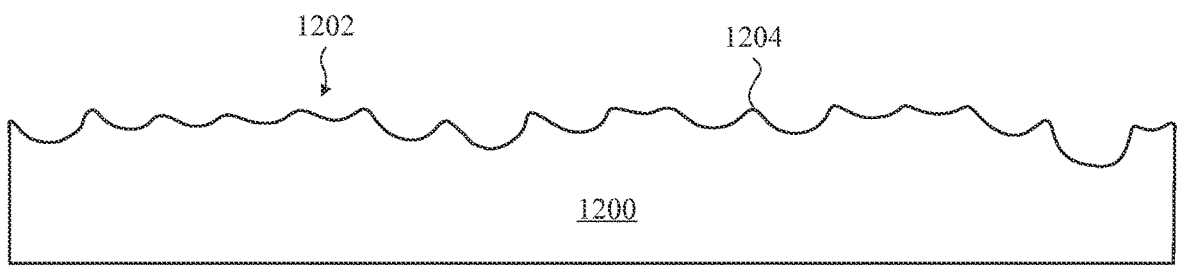
Figure 12C:
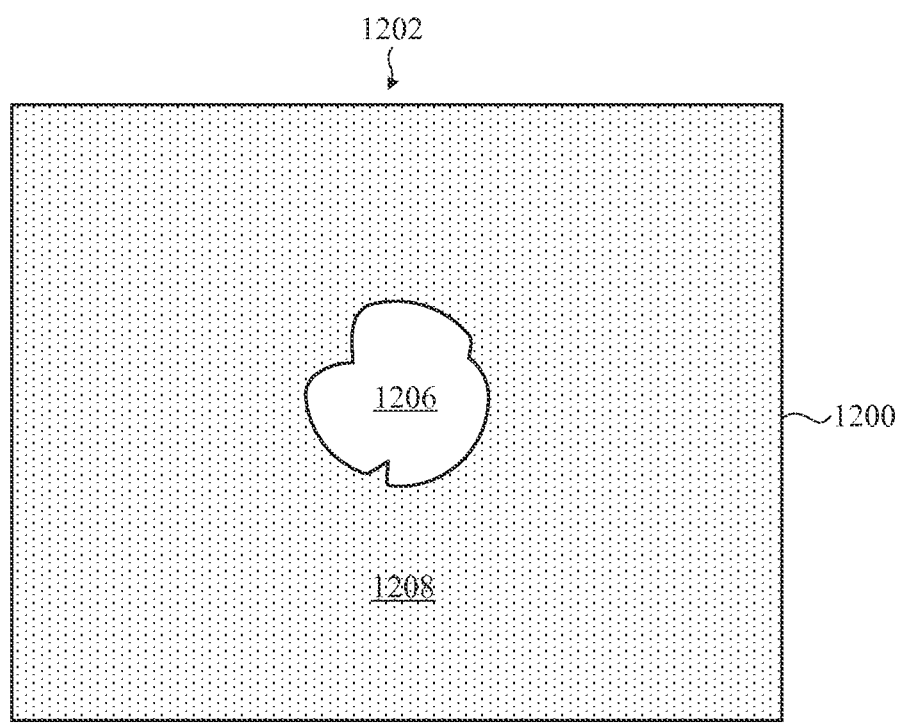

FIGS. 12A-12C show close up cross section views and a plan view of substrate 1200 undergoing an alternative laser polishing operation. FIG. 12A shows substrate 1200 prior to the laser polishing operation having multiple peaks 1204 that can give surface 1202 a dull or matte appearance. Surface 1202 can correspond to a blasted surface. FIG. 12B shows substrate after a laser polishing process where peaks 1204 are rounded off to a lesser degree than the embodiments shown in FIGS. 11A-11C. This can be accomplished by using an even lower laser energy than described above with reference to FIGS. 11A-11C. The lower laser energy rounds peaks 1204 increasing the specular reflectivity of surface 1202, while still leaving the general shape of peaks 1204 intact. In some embodiments, surface 1202 is further treated with an etching operation that gives surface 1202 a combination of glossy and matte appearance, or "satin" appearance. FIG. 12C shows a plan view of substrate 1200 with portion 1208 having the satin appearance and portion 1206 having a mirror shine. Portion 1206 can be polished using one or more mechanical, chemical, electrochemical and laser polishing processes and correspond to a design such as a logo.

In some cases, a laser polishing operation is used in place of a chemical or electrochemical polishing operation. This can be due to the high degree of polished control that laser polishing can provide compared to chemical and electrochemical polishing, as described above. In addition, laser polishing can simplify a manufacturing process flow and decrease production time. This is because traditional chemical polishing or electrochemical polishing operations generally require masking of areas that are not polished in order to avoid exposure of these areas to the chemical/electrochemical solutions. For example, forming the varied textured surface 1202 of substrate 1200 using traditional methods may require the following steps: First, surface 1202 is mechanically polished so that portion 1206 and portion 1208 attain a mirror shine. Next, portion 1206 is masked. Subsequently, portion 1208 is blasted and exposed to a chemical or electrochemical polishing operation to attain a satin appearance. Then, the mask is removed from portion 1206. The masking is necessary in order to prevent exposure of portion 1206 to the harsh conditions of chemical or electrochemical polishing, which would destroy its mirror shine. Then, substrate 1200 undergoes an anodizing process to from a protective metal oxide layer over surface 1202.

In contrast, a laser polishing process can be used to locally produce a desired surface quality without masking. The following two examples are ways of creating a varied textured surface, such as surface 1202, using laser polishing processes described herein.

Example 1

Surface 1202 is polished to a mirror shine using one or more of mechanical, chemical, electrochemical and laser polishing. Next, indented features are formed on portion 1208 using a textured laser process. The indented features can be tailored to appear like a blasted surface, such as a pseudo-random pattern. In other embodiments, the indented features form a regular pattern or a predetermined design described above. Portion 1208 can also be laser polished to round peaks within the laser textured surface and add specular reflectance to portion 1208. Since laser texturing allows for fine control, portion 1206 is not affected by the laser texturing process and retains its mirror shine without use of a mask. Next, surface 1202 can be anodized.

Example 2

Substrate 1200 is formed using a machining process. Next, indented features are formed on portion 1208 using a textured laser process and laser polished to add specular reflectance. In addition, the laser only applies a laser polishing process to portion 1206 that locally melts material of substrate 1200 and forms a mirror polish on portion 1206. Portion 1206 and portion 1208 can be laser processed using a single laser operation or separate laser operations.

Both of the examples described above can be used to form the varied textured surface 1202 without the use of a mask. In some cases, the varied texture surface can be formed entirely using laser process without the use of mechanical, chemical and electrochemical polishing. In this way, laser texturing and polishing can greatly simplify the manufacturing of substrate 1200. Likewise, the laser texturing and polishing process described herein can be used in any suitable combination to form other predetermined patterns and designs and create other visual effects on a substrate.

Figure 13:
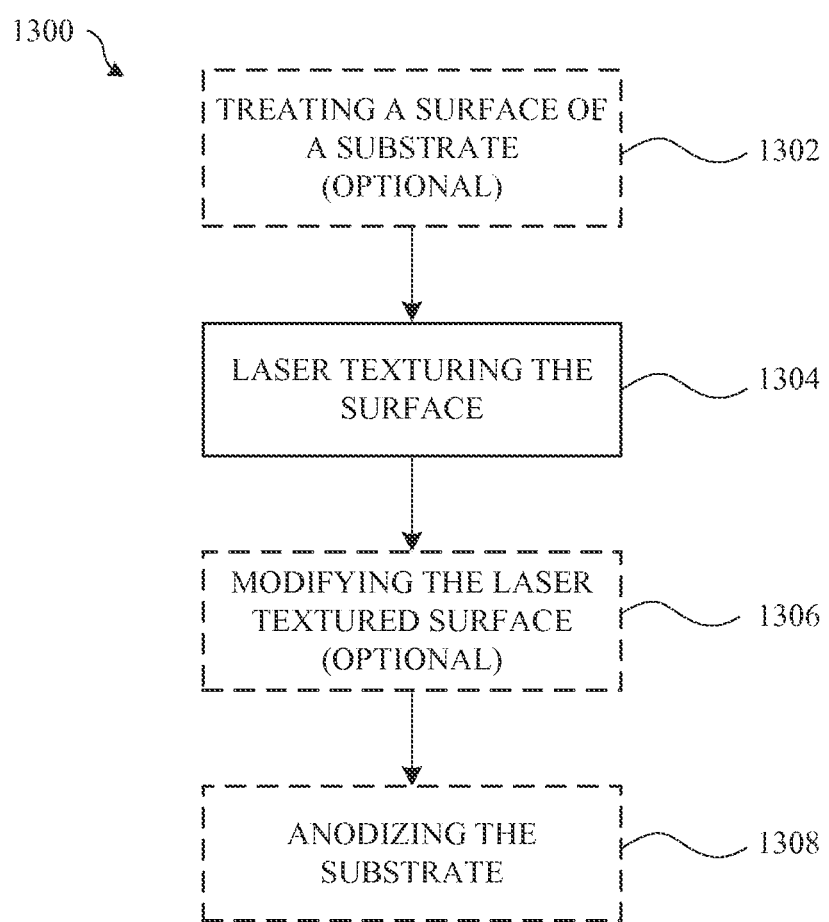
FIG. 13 shows a flowchart indicating a laser texturing and anodizing process, in accordance with some embodiments.

FIG. 13 shows flowchart 1300 indicating a laser texturing and anodizing process in accordance with some embodiments. At 1302, a surface of a substrate is optionally treated prior to a laser texturing operation. The surface treatment can include one or more of mechanical, chemical, electrochemical and laser polishing, as well as other texturing processes such as blasting and/or chemical etching. The substrate can be made of any suitable material, including metal (e.g., aluminum alloy or stainless steel), glass, ceramic, plastic, or a combination thereof.

At 1304, the surface of the substrate is laser textured by impinging a laser beam at the surface having a laser beam energy sufficient to ablate portions of the substrate. The laser beam can be finely controlled to form intricate patterns and designs on the substrate, or can be used to form a pseudo-random pattern that mimics a blasted surface. In some embodiments, the laser beam forms features with geometries specifically designed to provide light reflecting and/or diffracting effects that give the substrate surface a unique appearance.

At 1306, the laser textured surface is optionally modified using one or more additional surface treatments. In cases where the substrate is to be anodized, the surface treatments can be referred to as pre-anodizing processes. In some cases, the surface treatments include conventional processes, such as chemical polishing and/or chemical etching. In some embodiments, the surface treatments include one or more additional laser processes, such as a laser polishing operation. In one embodiment, the surface treatment includes chemical polishing to round off laser formed peaks and add specular reflection, then acid and/or alkaline etching to add micro-texture and creating a satin appearance. In some embodiments, the type of surface treatment process depends on the geometry of the textured surface and on a desired final appearance of the substrate.

At 1308, for substrates that are anodizable, the substrate is optionally anodized in order to form a protective metal oxide coating. In some embodiments, the anodizing process is customized based on the geometry of the textured surface and on a desired visual effect of the substrate. For example, the anodizing process can be tuned to create a substantially transparent metal oxide layer such that the laser formed features within the substrate are clearly viewable. In some embodiments, the anodizing process is tuned to create a metal oxide layer having a predetermined thickness that adds visual effects to the surface of the part via refraction of incoming light. In some embodiments, different surface portions of the substrate are treated with different anodizing processes based on laser formed features in the different surface portions. In some embodiments, the metal oxide layer is polished to have a shiny exterior surface.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of forming a housing for a portable electronic device, the method comprising:
    forming surface features on a planar surface of a metal substrate by using a laser, wherein the surface features are arranged according to a regular and repeating pattern, wherein at least one of the surface features includes a cavity defined by walls that (i) extend from the planar surface and into the metal substrate to a depth of at least 10 micrometers, and (ii) include a first reflective micro-feature and a second reflective micro-feature; and
    forming an anodized layer from the metal substrate such that the anodized layer overlays the surface features, wherein the first and second reflective micro-features are oriented at first and second angles, respectively, relative to an external surface of the anodized layer.

2. The method of claim 1, wherein using the laser to form the surface features comprises:
    melting a portion of the metal substrate; and
    resolidifying the melted portion of the metal substrate.

3. The method of claim 2, wherein the laser ablates the portion of the metal substrate.

4. The method of claim 2, wherein the walls are formed of resolidifed metal.

5. The method of claim 1, wherein the housing is characterized as having a uniform thickness, and a thickness of the metal substrate and a thickness of the anodized layer contribute to the uniform thickness.

6. The method of claim 1, wherein the surface features have widths between 100 micrometers to 1 millimeter.

7. A housing for a portable electronic device, the housing comprising:
    a metal substrate having a planar external surface including a repeated and regular pattern of surface features, wherein at least one of the surface features includes a cavity defined by walls that (i) extend from the planar external surface and into the metal substrate to a depth of at least 10 micrometers, and (ii) include a first reflective micro-feature and a second reflective micro-feature; and
    an anodized layer overlaying the surface features, wherein the first and second reflective micro-features are oriented relative to an external surface of the anodized layer at a first angle and a second angle different than the first angle.

8. The housing of claim 7, wherein the housing is characterized as having a uniform thickness, and a thickness of the metal substrate and a thickness of the anodized layer contribute to the uniform thickness.

9. The housing of claim 7, wherein each of the surface features has a width between 100 micrometers to 1 millimeter.

10. The housing of claim 7, wherein the first and second reflective micro-features are included on one of the walls.

11. The housing of claim 7, wherein the anodized layer is transparent to visible light that is incident at the external surface of the anodized layer so that the reflective first and second micro-features are viewable through the external surface of the anodized layer.

12. The housing of claim 7, wherein portions of the planar external surface of the metal substrate are parallel to the external surface of the anodized layer.

13. The housing of claim 7, wherein the anodized layer is characterized as having a shape that is capable of focusing visible light towards the first and second reflective micro-features so as to impart the metal substrate with a sparkling appearance.

14. The housing of claim 7, wherein the repeated and regular pattern of surface features is formed by ablating the planar external surface of the metal substrate with a laser.

15. The housing of claim 7, wherein visible light that passes through the anodized layer is reflected by the first and second reflective micro-features at varying angles.

16. A housing for a portable electronic device, the housing comprising:
    a metal substrate including a planar surface having a regular and repeating pattern of reflective features, wherein at least one of the reflective features includes a cavity defined by walls that (i) extend from the planar surface and into the metal substrate to a depth of at least 10 micrometers, and (ii) include a first reflective micro-feature and a second reflective micro-feature; and
    an anodized layer overlaying the reflective features, wherein the first and second reflective micro-features are oriented at first and second different angles, respectively, relative to an external surface of the anodized layer.

17. The housing of claim 16, wherein the external surface of the anodized layer is parallel to portions of the planar surface of the metal substrate.

18. The housing of claim 17, wherein the housing is characterized as having a uniform thickness, and a thickness of the metal substrate and a thickness of the anodized layer contribute to the uniform thickness.

19. The housing of claim 16, wherein each of the surface features have a width between 100 micrometers to 1 millimeter.

* * * * *